Sept. 13, 1949.    R. E. MAES    2,481,606
TOP FOR MILKING MACHINE CONTAINERS
Filed March 9, 1945
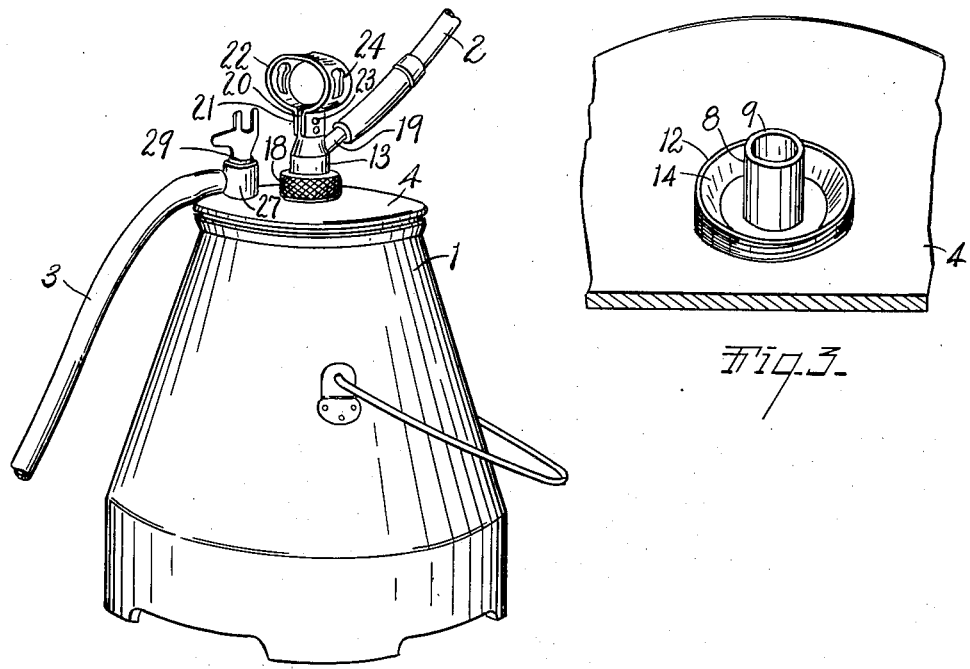
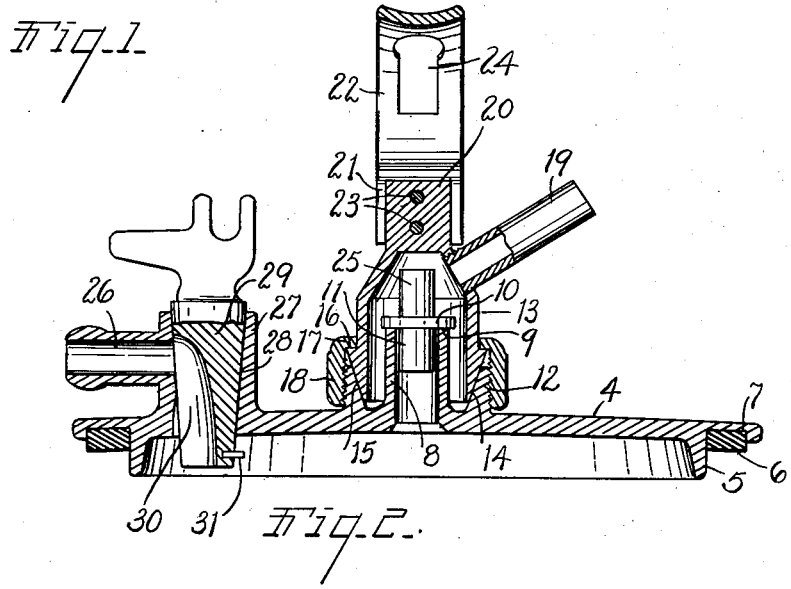
INVENTOR.
Robert E. Maes
BY
Earl D. Chappell
ATTORNEYS.

Patented Sept. 13, 1949

2,481,606

UNITED STATES PATENT OFFICE 2,481,606

TOP FOR MILKING MACHINE CONTAINERS

Robert E. Maes, Marshall, Mich.

Application March 9, 1945, Serial No. 581,907

6 Claims. (Cl. 31—58)

This invention relates to improvements in top for milking machine containers.

The main objects of this invention are:

First, to provide a top for milking machine containers adapted to be attached to a vacuum line providing an effective combined valve structure and trap.

Second, to provide a top having these advantages which is easily kept in a sanitary condition.

Objects pertaining to details and economies of the invention will definitely appear from the description to follow. The invention is defined in the claims.

A structure which embodies the features of my invention is clearly illustrated in the accompanying drawing in which:

Fig. 1 is a perspective view of a milking machine container embodying my invention, the suction line hose connection and pulsator unit connection being partially broken away.

Fig. 2 is an enlarged fragmentary view mainly in vertical section.

Fig. 3 is a fragmentary perspective view of portions of the structure.

In the accompanying drawing 1 represents a milking machine container adapted to be attached to a pulsator teat cup unit and also to a suction line or source of vacuum. The vacuum conduit is indicated at 2 and the suction or pulsator teat cup unit connection is indicated at 3. The present structure may be used with any teat cup pulsator unit.

The cover or top 4 is formed as a casting and is provided with a flange 5 fitting within the container and with an annular gasket 6 supported in a gasket seat 7 provided therefor in the outside of the flange. The cover has an upstanding tubular combined valve seat and inner trap member 8 formed integrally therewith, the upper edge 9 of this member 8 constituting a valve seat for the poppet valve 10. The valve has a downwardly projecting portion 11 loosely and slidably fitting within the member 8.

The top is provided with an annular integral flange 12 disposed concentrically of the member 8 and spaced therefrom to receive the lower end of the casing member 13. This flange is internally tapered at 14 while the casing 13 is externally tapered at 15 to fit within the flange. The casing has an annular external shoulder 16 engaged by the flange 17 of the clamping collar 18 which is threaded upon the flange 12. The casing is provided with a nipple 19 adapted to receive the conduit 2.

The casing has an upstanding flat extension 20 to which the ends 21 of the handle 22 are secured as by the rivets 23. The handle has keyhole slots 24 adapted to receive supporting members on a pulsator unit. The valve 10 has an upstanding portion 25 which coacts with the top of the casing member to limit the opening movement of the valve.

With the parts thus arranged any condensation flowing down the pipe or conduit 2 is collected in the space around the combined valve and inner trap member 8. The casing element 13 may be easily freed for discharging any collection of liquid in the trap and also for cleaning the parts. It will be appreciated that in milking machines all parts must be capable of being effectively cleaned and sterilized.

The conduit 3 is engaged with the nipple 26 opening to the valve casing 27 which is internally tapered at 28 to receive the tapered plug valve 29, this valve having a port or passage 30 adapted to be brought into register with the nipple connection 26 or to be rotated to close that connection. The valve casing 27 is also formed integrally with the top 4. A pin or retainer 31 is provided for the valve, this being removable so that the valve may be easily removed for cleaning if desired, although it will be observed that the retaining pin is spaced from the inner side of the cover so that the valve can be partially withdrawn, allowing cleaning water or fluid and sterilizing water to flow around the same. This is ordinarily sufficient to properly clean and sterilize these parts, but the valve may be completely removed when the cover is removed. It will be noted that the clamping collar 18 is retained on the casing member by means of the nipple 19 but is loose thereon so that the parts can be effectively cleaned and sterilized.

I have illustrated and described my invention in a very desirable embodiment; I have not attempted to illustrate or describe modifications in structural detail which I contemplate as it is believed this disclosure will enable the embodiment and adaptation of the invention as may be desired.

Having thus described my invention what I claim as new and desire to secure by Letters Patent is:

1. A top for a milking machine container provided with an upstanding tubular member, said tubular member being provided with a valve seat, an internally tapered externally threaded flange surrounding said tubular member in spaced relation thereto, a casing having a downwardly tapered end portion fitting within said flange and coacting with said tubular member to provide a trap, said casing being externally shouldered and provided with a nipple for connection with a suction conduit, a coupling collar threaded upon said flange to engage said shoulder on said casing member for clamping said casing member within said flange, and a weighted poppet valve arranged to coact with said valve seat and having a stem loosely projecting into said tubular member and extending above the valve to coact with the top of the casing member limiting the opening movement of the valve, said stem being guidingly supported by said tubular member when the valve is at the limit of its opening movement, said casing being open at the bottom thereof and said upstanding tubular member being mounted on the container top independently of said casing to permit access to the tubular member, valve and interior of the casing upon removal of the casing from said flange.

2. A top for milking machine containers provided with an upstanding tubular member, the top edge of said tubular member constituting a valve seat, an internally tapered externally threaded flange surrounding said tubular member in spaced relation thereto, a casing having a downwardly tapered end portion fitting within said flange and coacting with said tubular member to provide a trap, said casing being open at the lower end thereof and externally shouldered and provided with a nipple for connection with a suction conduit, a coupling collar threaded upon said flange to engage said shoulder on said casing member for clamping said casing member within said flange, and a weighted poppet valve arranged to coact with said valve seat and having a stem loosely projecting into said tubular member and extending above the valve to coact with the top of the casing member limiting the opening movement of the valve, said stem being guidingly supported by said tubular member when the valve is at the limit of its opening movement.

3. A top for a milking machine container having an upstanding tubular member, said tubular member being provided with a valve seat, a valve on said seat, an externally threaded flange surrounding and spaced from said tubular member, a casing fitting within said flange and coacting with said tubular member to provide a trap, said casing being externally shouldered and provided with a nipple for connection with a suction conduit, and a coupling collar threaded upon said flange to engage said shoulder on said casing member for clamping said casing member within said flange, said casing being open at the bottom thereof and said upstanding tubular member being mounted on the container top independently of said casing to permit access to the tubular member, valve and interior of the casing upon removal of the casing from said flange.

4. A top for a milking machine container having an upstanding tubular member, said tubular member being provided with a valve seat, a valve on said seat, an externally threaded flange surrounding and spaced from said tubular member, a casing fitting within said flange and coacting with said tubular member to provide a trap, and means for detachably securing said casing to said flange, said casing being open at the bottom thereof and said upstanding tubular member being mounted on the container top independently of said casing to permit access to the tubular member, valve and interior of the casing upon removal of the casing from said flange.

5. A top for a milking machine container having an upstanding tubular member, the top edge of said member constituting a valve seat, an externally threaded internally tapered flange surrounding and spaced from said tubular member, a casing having a downwardly tapered end portion open at the lower end thereof and fitting within said flange and coacting with said tubular member to provide a trap, means for detachably securing said casing to said flange, and a weighted poppet valve arranged to coact with said valve seat and having a stem loosely projecting into said tubular member and extending above the valve to coact with the top of the casing member limiting the opening movement of the valve, said stem being guidingly supported by said tubular member when the valve is at the limit of its opening movement.

6. A top for a milking machine container comprising a top member for closing the container, a tubular member disposed on said top member and provided with a valve seat, a valve on said seat, an annular flange projecting upwardly from said top member and surrounding said tubular member and spaced therefrom to provide an annular space between said flange and tubular member, a casing open at the bottom thereof and fittingly mounted on said flange and coacting with said tubular member to provide a trap, means for detachably connecting said casing to said annular flange, said casing having a suction conduit connected thereto above said flange, said casing upon removal from said annular flange permitting access to said valve, tubular member and the interior of the casing.

ROBERT E. MAES.

REFERENCES CITED

The following references are of record in the file of this patent:

UNITED STATES PATENTS

| Number | Name | Date |
| --- | --- | --- |
| 707,712 | Nethery | Aug. 26, 1902 |
| 1,111,562 | Burrell | Sept. 22, 1914 |
| 1,262,263 | Rust | Apr. 9, 1918 |
| 1,301,245 | Fox | Apr. 22, 1919 |
| 1,441,772 | Wilson | Jan. 9, 1923 |
| 1,500,011 | Smith | July 1, 1924 |
| 1,786,846 | Hodsdon | Dec. 30, 1930 |
| 2,118,670 | Green | May 24, 1938 |

FOREIGN PATENTS

| Number | Country | Date |
| --- | --- | --- |
| 325,355 | Great Britain | Feb. 20, 1930 |